United States Patent
Lawrence et al.

(10) Patent No.: US 7,288,009 B2
(45) Date of Patent: Oct. 30, 2007

(54) APPARATUS AND METHOD FOR INTERCONNECTING A CHILD SEAT AND MONITORING SYSTEM

(75) Inventors: Rodney A. Lawrence, Frankfort, IN (US); Ronald B. Ketwitz, Jr., Rutherfordton, NC (US); Jay L. Kelly, Kokomo, IN (US); Steven D. Felix, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/221,592

(22) Filed: Sep. 8, 2005

(65) Prior Publication Data

US 2006/0057900 A1   Mar. 16, 2006

Related U.S. Application Data

(60) Provisional application No. 60/607,988, filed on Sep. 8, 2004.

(51) Int. Cl.
*H01R 13/24* (2006.01)

(52) U.S. Cl. .......................... 439/824; 439/34
(58) Field of Classification Search ................ 439/824, 439/34
See application file for complete search history.

(56) References Cited

U.S. PATENT DOCUMENTS

| | | | | |
|---|---|---|---|---|
| 4,538,142 A * | 8/1985 | Hamilton et al. | ........... | 340/667 |
| 5,656,994 A | 8/1997 | Heninger | ................. | 340/457.1 |
| 5,711,574 A | 1/1998 | Barnes | .................. | 297/216.11 |
| 5,720,519 A | 2/1998 | Barnes | .................. | 297/216.11 |
| 5,833,311 A * | 11/1998 | Friedrich et al. | ...... | 297/216.11 |
| 5,980,335 A * | 11/1999 | Barbieri et al. | ............ | 439/824 |
| 6,151,540 A | 11/2000 | Anishetty | ..................... | 701/45 |
| 6,246,936 B1 | 6/2001 | Murphy et al. | ............... | 701/45 |
| 6,272,936 B1 | 8/2001 | Oreper et al. | .......... | 73/862.621 |
| 6,371,516 B1 | 4/2002 | Miyagawa | .................. | 280/735 |
| 6,438,476 B1 | 8/2002 | Gray et al. | ................... | 701/45 |
| 6,490,936 B1 | 12/2002 | Fortune et al. | ........ | 73/862.581 |
| 6,554,318 B2 | 4/2003 | Kohut et al. | ............. | 280/801.1 |
| 6,578,871 B2 | 6/2003 | Gray et al. | ................. | 280/735 |
| 6,587,770 B1 | 7/2003 | Gray et al. | .................... | 701/45 |
| 6,605,877 B1 | 8/2003 | Patterson et al. | .......... | 307/10.1 |
| 6,644,689 B2 | 11/2003 | Murphy | ...................... | 280/735 |
| 6,650,978 B1 | 11/2003 | Patterson et al. | ............. | 701/35 |
| 6,662,094 B2 | 12/2003 | Murphy et al. | ............... | 701/45 |
| 6,683,534 B2 | 1/2004 | Patterson et al. | ........... | 340/436 |

(Continued)

OTHER PUBLICATIONS

Micronas, HAL 18xx, Low-Cost Programmable Linear Hall-Effect Sensor, Mar. 2003.

*Primary Examiner*—James Harvey
(74) *Attorney, Agent, or Firm*—Douglas D. Fekete (57) ABSTRACT

A child seat adapted for use in a vehicle, the child seat comprising: a base portion; a carrier portion configured to be removably secured to the base portion; a restraint system component; a sensor for providing a signal indicative of a state of the restraint system component; an electronic control unit secured to either the carrier portion or the base portion, the electronic control unit being operably coupled to the restraint system component to receive the signal, the electronic control unit being capable of processing the signal to provide an output indicative of the state of the restraint system component; and an electrical connector for providing electrical connection between the sensor and the electronic control unit.

22 Claims, 6 Drawing Sheets

U.S. PATENT DOCUMENTS

| | | | |
|---|---|---|---|
| 6,749,038 B2 | 6/2004 | Sullivan et al. | 180/268 |
| 6,796,192 B2 | 9/2004 | Sullivan et al. | 73/862.391 |
| 6,812,844 B1 | 11/2004 | Burgess | 340/573.1 |
| 6,818,842 B2 | 11/2004 | Gray et al. | 177/144 |
| 6,847,302 B2 | 1/2005 | Flanagan et al. | 340/666 |
| 6,850,825 B2 | 2/2005 | Murphy et al. | 701/45 |
| 6,851,503 B2 | 2/2005 | Almaraz et al. | 180/268 |
| 6,854,415 B2 | 2/2005 | Barnes et al. | 116/67 R |
| 6,868,745 B2 | 3/2005 | Sullivan et al. | 73/862.391 |
| 6,889,146 B2 | 5/2005 | Sullivan et al. | 702/43 |
| 2004/0113634 A1* | 6/2004 | Stanley et al. | 324/661 |
| 2005/0026499 A1* | 2/2005 | Choi | 439/607 |
| 2005/0030188 A1 | 2/2005 | Flanagan et al. | 340/667 |
| 2006/0057900 A1* | 3/2006 | Lawrence et al. | 439/824 |

* cited by examiner

APPARATUS AND METHOD FOR INTERCONNECTING A CHILD SEAT AND MONITORING SYSTEM

CROSS REFERENCE TO RELATED APPLICATIONS

The application claims the benefit of U.S. Provisional application, Ser. No. 60/607,988, filed Sep. 8, 2004, the contents of which are incorporated herein by reference thereto.

This application is also related to the following U.S. patent applications filed Jun. 6, 2005 and entitled: CHILD SEAT AND MONITORING SYSTEM, Ser. No. 11/146,927; CHILD SEAT MONITORING SYSTEM AND METHOD FOR DETERMINING A TYPE OF CHILD SEAT, Ser. No. 11/146,939; CHILD RESTRAINT SYSTEM AND METHOD FOR MONITORING INSTALLATION OF THE CHILD RESTRAINT SYSTEM, Ser. No. 11/147,148; CHILD RESTRAINT SYSTEM AND METHOD FOR MONITORING INSTALLATION OF THE CHILD RESTRAINT SYSTEM, Ser. No. 11/146,926; CHILD RESTRAINT SYSTEM COMPRISING WEIGHT SENSOR, Ser. No. 11/146,921; CHILD RESTRAINT SYSTEM COMPRISING CONTROL UNIT FOR EVALUATING HARNESS ADJUSTMENT, Ser. No. 11/147,149; and CHILD SEAT AND MONITORING SYSTEM, Ser. No. 11/146,928 the contents each of which are incorporated herein by reference thereto.

TECHNICAL FIELD

This present invention relates generally to child seats and restraint systems wherein the child seat is equipped with an apparatus and system for monitoring various states of the restraint system and the child secured therein. More specifically, the present invention is related to an apparatus and method for facilitating the electrical connection of the monitoring system and its sensors when the monitoring system is used with a child seat utilizing a base portion and a removable portion.

BACKGROUND

Usage of child and/or infant seats in vehicles has become commonplace and in some situations legally required. Many child seats are removably secured to the vehicle by securing a base portion to the vehicle by passing a seat belt or anchor tether through an opening or openings in the base portion, wherein the child seat or infant seat further comprises a removable carrier portion configured to "snap in" or lockingly engage the base portion.

As discussed in the above-identified related patent applications an electronic control unit is configured to provide indications of conditions relating to the child seat (e.g., base portion and carrier portion), its occupant and/or its installation. In these applications the child seat will comprise an electronic control unit secured to either the base portion or the carrier portion of the child seat. In addition, the electronic control unit will also be operably coupled to a plurality of sensors each providing additional signals indicative of states of the child seat to the electronic control unit and the electronic control unit is capable of processing the additional signals to compare the additional signals to acceptable values, wherein the electronic control unit provides additional outputs indicating whether the additional signals are at acceptable values and the additional outputs are provided to a display. Examples of such parameters being monitored by the sensors include but are not limited to: monitoring infant seat harness latch state; monitoring infant seat harness tension; perform infant seat weight classification; monitoring infant seat-to-base interlock state; monitoring infant seat angle and seat orientation; monitoring infant seat for exposure to severe impact or vehicle crash; monitoring rear facing infant seat base for contact with vehicle seatbelt; monitoring rear facing infant seat base for tension of vehicle seatbelt or lower tether; monitoring chest retainer clip for proper engagement; monitoring chest retainer clip for proper vertical height on the harness; monitoring shoulder harness slots for proper adjustment wherein audible and/or visual indications or warnings are provided to alert an individual if there is non-compliance with any of the monitored states.

In each instance, the sensors are electrically coupled to the electronic control module wherein the electronic control module provides an electrical signal indicative of the property being sensed. However, and since the sensor may be located in both the carrier portion and the base portion and the electronic control unit may be disposed on either the carrier portion or the base portion there exists a need to provide a means for electrically connecting the components of base portion to the carrier portion. Moreover, and since the intended use is for a child seat the electrical connector needs to be able to withstand exposure to debris, liquids etc. as well as be configured to withstand repeated contact as the carrier portion is constantly inserted and removed from the base portion.

Accordingly, it is desirable to provide an electrical connector that will complete electrical connections for a child safety restraint system when a carrier portion of the child seat is secured to a base portion of the child seat.

SUMMARY

Disclosed herein is a device and method for providing an electrical connection between a carrier portion and a base portion of a child seat having a system for monitoring and providing an indication of various parameters of the child seat.

In accordance with an exemplary embodiment a child seat adapted for use in a vehicle is provided. The child seat comprising: a base portion; a carrier portion configured to be removably secured to the base portion; a restraint system component; a sensor for providing a signal indicative of a state of the restraint system component; an electronic control unit secured to either the carrier portion or the base portion, the electronic control unit being operably coupled to the restraint system component to receive the signal, the electronic control unit being capable of processing the signal to provide an output indicative of the state of the restraint system component; and an electrical connector for providing electrical connection between the sensor and the electronic control unit, the electrical connector comprising: a first contact member secured to either the base portion or the carrier portion, the first contact member having a plurality of contact surfaces; and a second contact member secured to either the base portion or the carrier portion, the second contact member having a plurality of spring biased contacts movably secured to the second contact member, wherein the plurality of contact surfaces of the first contact member are configured to make contact with the plurality of spring biased contacts when the carrier portion is secured to the base portion.

Disclosed herein is a method for providing an electrical connection between a carrier portion and a base portion of a child seat having a electronic control unit configured to receive a plurality of signals from a plurality of sensors located in the carrier portion and the base portion, the method comprising: securing a first contact member to either the base portion or the carrier portion, the first contact member having a plurality of contact surfaces; securing a second contact member to either the base portion or the carrier portion, the second contact member having a plurality of spring biased contacts movably secured to the second contact member, wherein the plurality of contact surfaces of the first contact member are configured to make contact with the plurality of spring biased contacts when the carrier portion is secured to the base portion, wherein the second contact member further comprises a plurality of springs disposed in a housing of the second contact member wherein each of the plurality of springs are configured to make electrical contact with a respective one of the plurality of spring biased contacts while also providing a termination end that depends away from an exterior surface the housing, wherein each of the plurality of springs also provides a biasing force to a respective one of the plurality of spring biased contacts and the electrical connector is configured to provide tolerances in three separate directions.

Also disclosed herein is an electrical connector configured to provide an electrical connection between a carrier portion and a base portion of a child seat having at least one sensor disposed in the carrier portion and an electronic control unit located within the base portion, the electrical connector comprising: a first contact member secured to either the base portion or the carrier portion, the first contact member having a plurality of contact surfaces; and a second contact member secured to either the base portion or the carrier portion, the second contact member having a plurality of spring biased contacts movably secured to the second contact member, wherein the plurality of contact surfaces of the first contact member are configured to make contact with the plurality of spring biased contacts when the carrier portion is secured to the base portion.

The above-described and other features of the present disclosure will be appreciated and understood by those skilled in the art from the following detailed description, drawings, and appended claims.

DESCRIPTION OF EXEMPLARY EMBODIMENTS

Disclosed herein is a method and apparatus for providing an electrical connector for a child seat having a system for monitoring and providing an indication of various parameters being sensed by a sensing system of the child seat.

Figure 1:
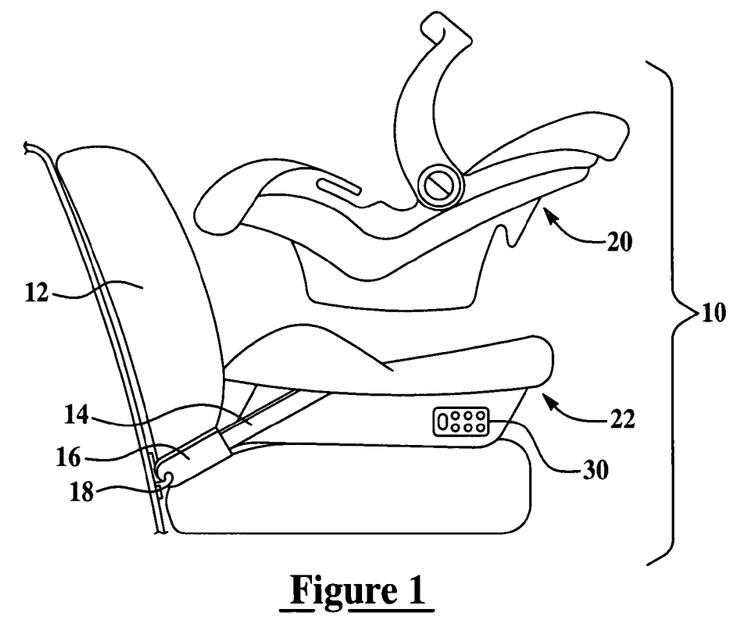
FIG. 1 is a perspective view of a child seat constructed in accordance with an exemplary embodiment of the present invention.
Figure 2A:
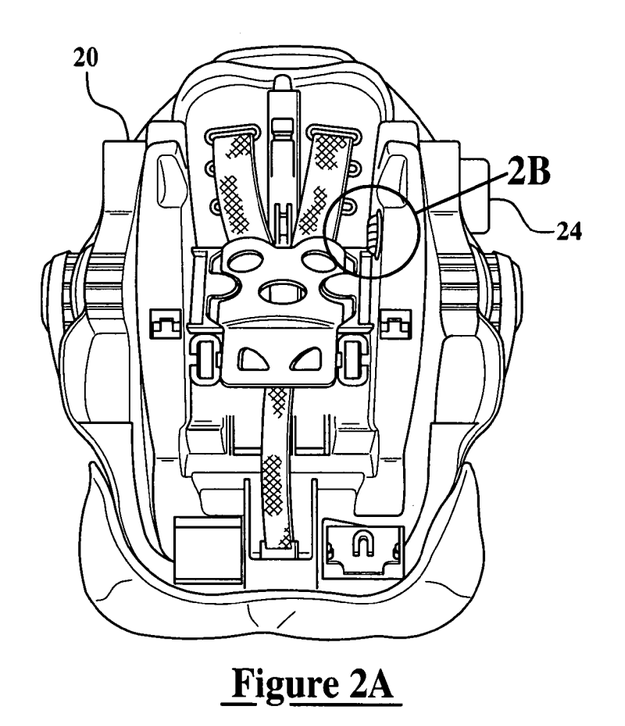
FIG. 2A is a bottom view of a carrier portion of a child seat constructed in accordance with an exemplary embodiment of the present invention.
Figure 2B:
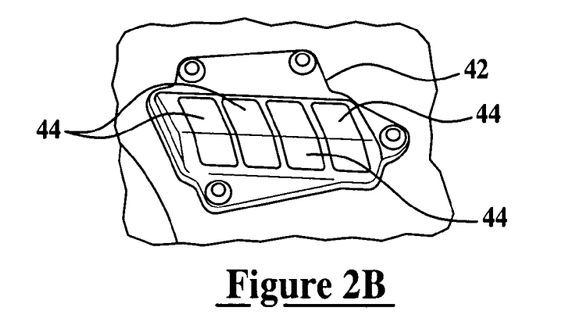
FIG. 2B is a view of an electrical connector disposed upon the carrier portion of the child seat in accordance with an exemplary embodiment of the present invention.
Figure 2C:
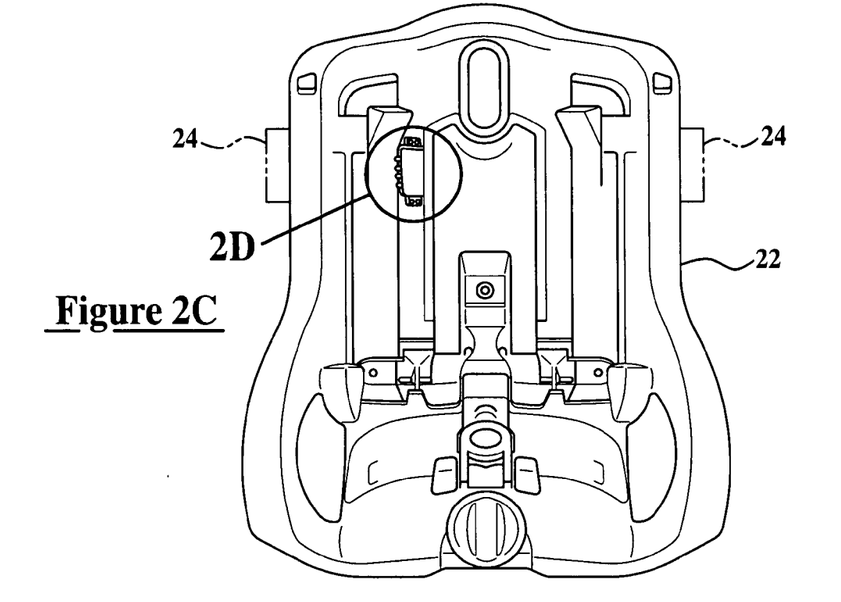
FIG. 2C is a top view of a base portion of a child seat constructed in accordance with an exemplary embodiment of the present invention.
Figure 2D:
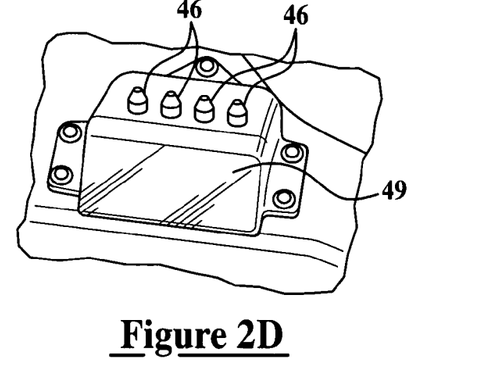
FIG. 2D is a view of an electrical connector disposed upon the base portion of the child seat in accordance with an exemplary embodiment of the present invention.

Referring now to FIGS. 1-2D, a child seat 10 constructed in accordance with an exemplary embodiment of the present invention is illustrated. Child seat 10 is configured to be secured to a seat 12 of a vehicle (not shown) by at least one adjustable securement tether 14, which is fixedly secured to the child seat at one end and comprises a latching device 16 at the other, although only one adjustable tether is shown in FIG. 1 it is contemplated that multiple adjustable tethers may be used. In accordance with an exemplary embodiment, latching device (16) comprises a hook or clasp for securement to at least one universal anchor 18 disposed on or proximate to the vehicle seat. Alternatively, the vehicle seatbelt may be used to secure the base portion to the seat.

Infant seat 10 comprises a carrier portion 20 removably secured to a base portion 22. In accordance with an exemplary embodiment, base portion 22 is fixedly secured to the vehicle seat by an adjustable tether comprising a pair of clasping portions disposed at either end adjustable tether for securement of the same to the vehicle via universal anchors 18. The base portion is intended to remain in the vehicle while the carrier portion is intended for transport of the child in vehicle as well as outside of the vehicle thereby allowing transport of the infant without having to remove the infant from the seat or carrier portion.

Accordingly, carrier portion 20 securely couples to the base portion for transporting a child within the vehicle, but may be disengaged from the base portion for carrying the child outside the vehicle.

Figure 3:
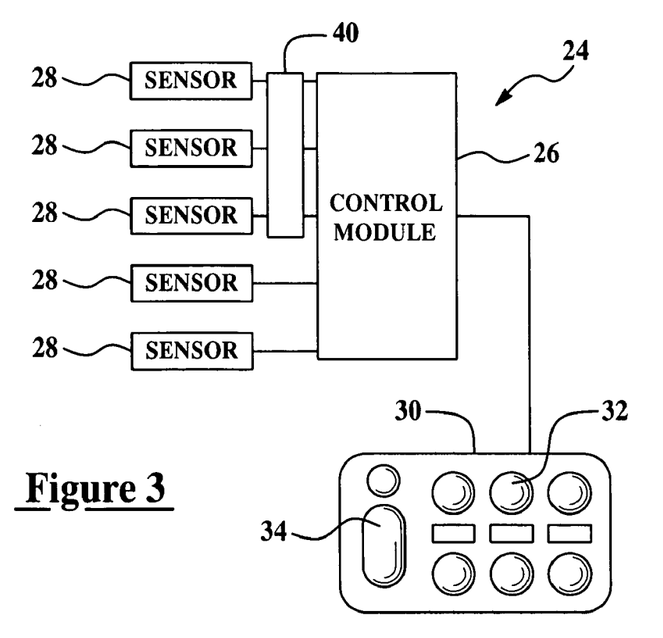
FIG. 3 is a schematic illustration of an electronic control unit and sensor interface in accordance with an exemplary embodiment of the present invention.

Referring now to FIGS. 1-3 and in accordance with exemplary embodiments of the present invention each child seat further comprises an electronic control unit 24. In accordance with an exemplary embodiment electronic control unit 24 is integral with a shell portion of carrier portion 20 or base portion 22. In accordance with an exemplary embodiment, the electronic control unit will comprise a microprocessor 26, microcontroller or other equivalent processing device capable of executing commands of computer readable data or program for executing a control algorithm that receives signals from a plurality of sensors 28 and provide an output to a display 30 via visual and/or audio drivers, wherein an indicator 32 of the electronic control unit is activated. In accordance with an exemplary embodiment, the electronic control unit is configured to have analog comparator circuitry for processing analog signals. In one embodiment analog comparator circuitry is provided as a stand-alone feature or in combination with other processing electronics.

In order to perform the prescribed functions and desired processing, as well as the computations therefore (e.g., the execution of fourier analysis algorithm(s), the control processes prescribed herein, and the like), the electronic control unit may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

In one contemplated embodiment the electronic control unit is adapted to receive signals transmitted thereto, one non-limiting example would be direct electrical communication via a wiring. In any of the aforementioned patent applications sensors are configured to provide signals to an electronic control unit coupled to the sensors, which comprises logic, comparators etc. and/or is adapted to provide additional signals upon receipt of a signal indicating the tether has a tension within an acceptable range.

In accordance with an alternative exemplary embodiment the sensor signal may then be processed in the electronic control unit with other signals from a child seat for example a chest harness buckle switch sensor and/or a chest harness tension sensor of the restraint belts of the child seat. Accordingly, the electronic control unit can determine the status of all the sensors and make an appropriate determination whether the child is secured properly in the child seat or not. The electronic control unit then can provide an output to the driver such as "Insufficient adjustable Tension", "adjustable Installation OK", or "adjustable Sensor Faulted" as a result of performing internal electronic control unit and sensor diagnostics, such text read outs may be viewable on a liquid crystal display 34 of the display.

Each status indication can also be displayed as a series of LED/lights that are visible to the driver, or through a speech system, communicated by the electronic control unit, or alternatively communicated to the vehicle for display in the instrument panel as part of a display to the driver. In accordance with an exemplary embodiment a standalone sensing system with an internal power supply, such as a battery or kinetic device that derives its power from the motion of the vehicle is provided wherein the display is integral with the child seat. Alternatively, the system could plug into the 12V DC power of the vehicle.

Examples of such additional parameters being monitored by the additional sensors include but are not limited to: monitoring infant seat harness latch state; monitoring infant seat harness tension; perform infant seat weight classification; monitoring infant seat-to-base interlock state; monitoring infant seat angle and seat orientation; monitoring infant seat for exposure to severe impact or vehicle crash; monitoring rear facing infant seat base for contact with vehicle seatbelt; monitoring rear facing infant seat base for tension of vehicle seatbelt or lower tether; monitoring chest retainer clip for proper engagement; monitoring chest retainer clip for proper vertical height on the harness; monitoring shoulder harness slots for proper adjustment wherein audible and/or visual indications or warnings are provided to alert an individual if there is non-compliance with any of the monitored states.

In each instance, the sensors are electrically coupled to the electronic control module wherein the electronic control module provides an electrical signal indicative of the property being sensed. The electronic control module will determine using a look-up table or analog circuit monitors and suitable algorithms, a desired value for the sensed property, which desired value, may be based upon the tension of the tether as determined by the tension sensor and if necessary, the control module provides an alert signal. In accordance with an exemplary embodiment a simple analog switch can be monitored with a simple comparator op-amp circuit, or logic gate wherein a signal may be generated for illuminating the display or providing another form of output (e.g., audible chime or visual text message). For the display shown herein and in accordance with an exemplary embodiment, the alert signal illuminates a green light when the sensed property is within a desired range, and a red light is illuminated when the sensed property is not within the desired range.

In accordance with an exemplary embodiment and since it is contemplated that both the electronic control unit and the sensors may be located on both the base portion and the carrier portion there must be a form of transmission of the signals to the electronic control unit. In the case of direct wiring of the sensors to the electronic control unit there must be an electrical connector 40 that will complete this connection when the carrier portion is inserted into the base portion. Electrical connector 40 is illustrated schematically in FIG. 3. In accordance with an exemplary embodiment electrical connector 40 will comprise a first contact member electrically coupled to a plurality of wires or wire harness coupled to sensors or the electronic control unit or both and a complimentary second contact member electrically coupled to a plurality of wires or wire harness coupled to sensors or the electronic control unit or both depending upon the location of the electronic control unit (e.g., base or carrier portion).

As illustrated, electrical connector 40 will provide a means for sending signals to the control module of the electronic control unit. Also illustrated in FIG. 3 are sensors that do not require the electrical connector 40 for providing a means for sending the signals to the electronic control unit. These sensors may be those directly wired to the electronic control unit (e.g., sensors disposed on the same portion of the child seat and thus do not require a connection). In addition and in accordance with an exemplary embodiment of the present invention, the majority of the sensors and/or electrical hardware can be located at the base portion of the child seat thus limiting the amount of weight which may be added to the carrier portion. For example, the microprocessor may be located on the base portion and only the display portion will be located on the carrier portion. Accordingly, connector 40 will also provide a means for coupling the display portion to the microprocessor. Therefore, exemplary embodiments of the present invention are directed to apparatus and methods for integrating a spring-loaded axial contact, or plunger, based electrical connection between any stay-in-car base and a detachable seat/carrier type Child Restraint System (CRS).

Another significant consideration when evaluating the type of electrical connection technology best suited for this application is the engage and disengage forces required to mate and un-mate the electrical connection. The mass of the detachable seat/carrier (with or without an infant) can be used as the necessary force required to engage the electrical connection during re-attachment into the stay-in-car base. However, and during the detachment process, any detachment forces created by the electrical connection will be in addition to the forces already required to remove the seat/carrier. Therefore, an electrical connection method that can both take advantage of the mass of the detachable seat/carrier (most often occupied by an infant) during re-attachment to the stay-in-car base and assist during the removal process is desirable.

Exemplary embodiments are directed to incorporating a spring-loaded axial contact based electrical connection system within the design of the Child Restraint System (CRS) in order to provide an electrical connection between any stay-in-car base and a detachable seat/carrier type CRS. The spring-loaded contacts, or plungers, portion of the connection system would be attached to either the seat/carrier or the stay-in-car base. The mating contact pads part of the connection system would be rigidly mounted to the other portion of the CRS. With this type of electrical connection system the spring-loaded contacts, or plungers, would compress along an axis perpendicular to the rigidly mounted contact pad surface while interlocking the seat/carrier into the stay-in-car base. The large interface tolerances found in a CRS application can readily be incorporated into this connection system design. This electrical connection system can also be designed to take full advantage of the mass of the detachable seat/carrier (with or without an infant) to compress the spring-loaded contacts and providing sufficient normal force to minimize the electrical contact resistance across the electrical interface and finally the spring loaded contacts can assist the operator in removing the detachable seat/carrier from the stay-in-car base, therefore providing an ergonomic enhancement to the system.

In accordance with an exemplary embodiment and as illustrated in FIGS. 2A-2D, a first connector portion or first contact member 42 is secured to a lower surface of carrier portion 20. First connector portion or first contact member 42 comprises a plurality of termination pads 44, which are configured to engage a plurality of contacts 46 disposed on a second connector portion or second contact member 48, which is secured to base portion 22. In accordance with an exemplary embodiment first contact member 42 and second contact member 48 are mounted within receiving areas or cavities disposed on a surface of the base portion or the carrier portion. Alternatively, the first contact member and a second contact member are directly mounted to a surface of the base portion or the carrier portion.

In accordance with an exemplary environment of the present invention plurality of contacts 46 are movably secured to second connector portion 48. More particularly, and in an exemplary embodiment, plurality of contacts 46 are spring biased such that the same can be depressed into second connector portion or second contact member 48 when carrier portion 20 is inserted into base portion 22. In addition, the surface area of termination pads 44 is significantly larger than the contact points of contacts 46. Accordingly, tolerances of three different directions are provided (e.g., the directions corresponding to the dimensions of the contacts on first connector 42 and the amount of movement provided by spring biased contacts 46. In addition, and since contacts 46 are spring biased the same will continue to make contact with termination pads 44 as the tips of contacts 46 wear down from repeated insertion and removal of carrier portion 20 with respect to base portion 22. Moreover, it is also understood that the movement of contacts 46 and the surface area of pads 44 will provide a form of direct electrical contact as the carrier may slightly move within the base portion when the same is secured therein.

It is, of course, understood that the first connector may be disposed on the base portion and the second connector may be disposed on the carrier portion. In addition, and referring now to FIGS. 2A-2D, the exterior configuration of first connector 42 and second connector 48 are configured to facilitate contact between termination pads 44 and contacts 46. For example, second connector 48 may comprise a chamfered surface 49 configured to slightly engage and direct a surface of first connector 42, which may also be angularly configured with respect to first connector 42.

Figure 4A:
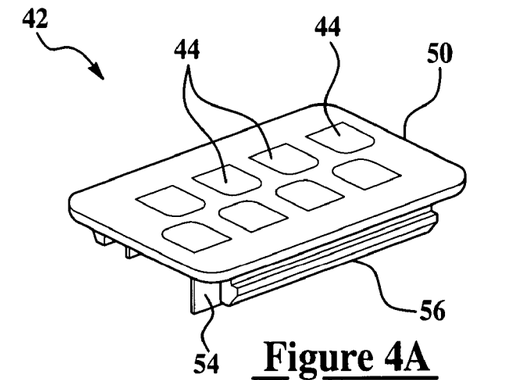
FIG. 4A is a top perspective view of a first electrical connector constructed in accordance with an exemplary embodiment of the present invention.
Figure 4B:
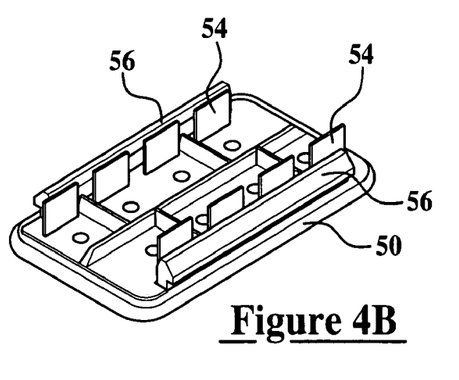
FIG. 4B is a bottom perspective view of a first electrical connector constructed in accordance with an exemplary embodiment of the present invention.
Figure 4C:
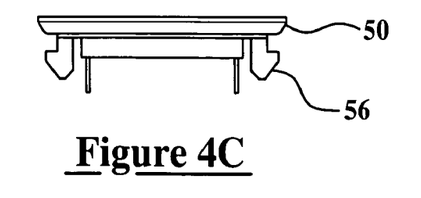
FIG. 4C is an end view of a first electrical connector constructed in accordance with an exemplary embodiment of the present invention.

Referring now to FIGS. 4A-4C an exemplary embodiment of first connector 42 is illustrated. Here a header portion 50 is configured to receive a plurality of termination pads 44 by for example, passing a portion of the same through a slotted opening in the header portion. Once installed therein termination pads 44 provide a low profile or flat surface for making contact with spring biased termination contact of the second connector. As illustrated, each of the termination pads 44 will comprise a termination end 54, which will ultimately be secured to a wire or an electrical connector that is either secured to a sensor or the electronic control unit of exemplary embodiments of the present invention. In addition, header portion 50 may also be configured to have a securement feature 56 for securing the same end to a cavity of either the carrier portion or the base portion. Thus, header portion 50 with a wire harness secured thereto may be snapped into its desired location on either the carrier or base portion. As illustrated, securement feature 56 comprises an elongated portion integrally formed with the header portion, wherein the elongated portion is configured to have a portion for engaging a feature on a feature of the surface to which it is mounted. Of course, numerous configurations for securement feature 56 are contemplated to be within the scope of the present invention.

Figure 5A:
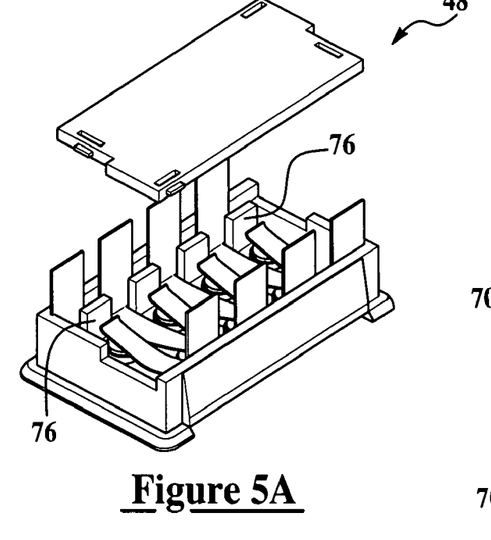
FIGS. 5A and 5B are exploded perspective views of a second electrical connector constructed in accordance with an exemplary embodiment of the present invention.
Figure 5B:
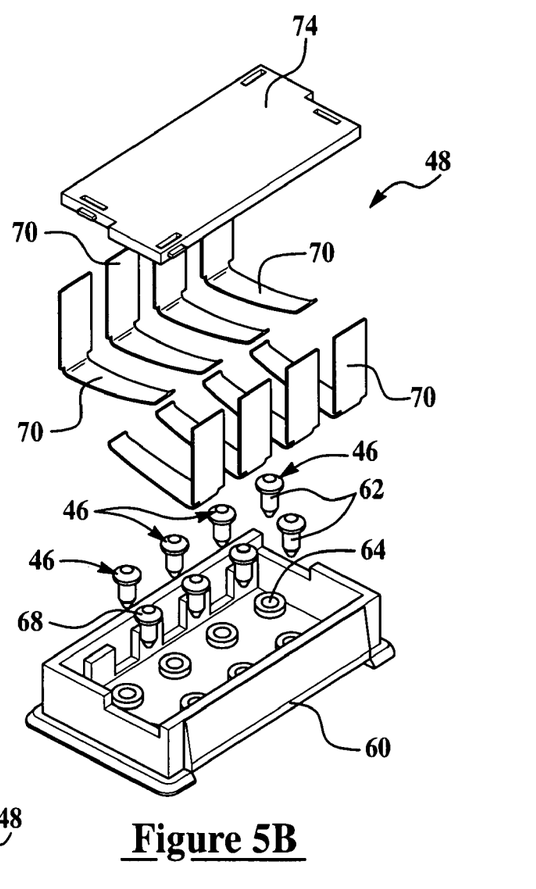
Figure 5C:
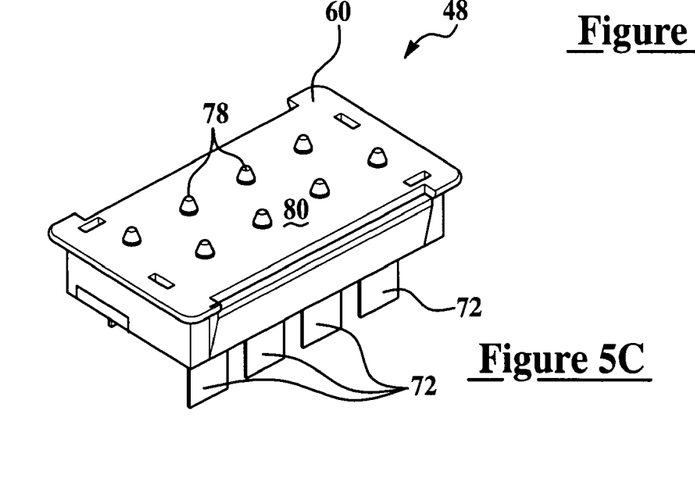
FIG. 5C is a top perspective view of a second electrical connector constructed in accordance with an exemplary embodiment of the present invention.

Referring now to FIGS. 5A-5C an exemplary embodiment of second connector 48 is illustrated. Second connector 48 comprises a housing portion 60. Housing portion 60 is configured to define a receiving area to receive a plurality of contacts 46. As illustrated, and in accordance with an exemplary embodiment of the present invention, contacts 46 are shaped as a pin, rivet or any equivalent structure having an elongated body portion 62 configured to slide within an opening 64 of housing 60 and head portion 68 that prevents the contact from passing completely through opening 64. In order to provide an electrical path to contacts 46 a plurality of contact members 70 are positioned to make contact with head portion 68 while also providing a terminating end 72 depends away from housing 60 after contact members 70 are secured therein by for example placing a cover portion 74 on to housing portion 60. As illustrated in FIGS. 5A and 5B contact members 70 are received within slotted openings or other equivalent features 76 located within housing portion 60. In one exemplary embodiment contact members 70 provide spring bias to contacts 46 (e.g., configuring contact members 72 to have a cantilevered spring configuration as well as also providing a terminating end). Thus, termination end 78 of the contacts are biased to protrude from an exterior surface of housing portion 60.

A non-limiting example of exemplary dimensions of housing portion 60 are as follows 2.18 inches×1.26 inches× 0.49 inches of course, dimensions greater or less than the aforementioned values are contemplated to be within the scope of the present invention.

Figure 6A:
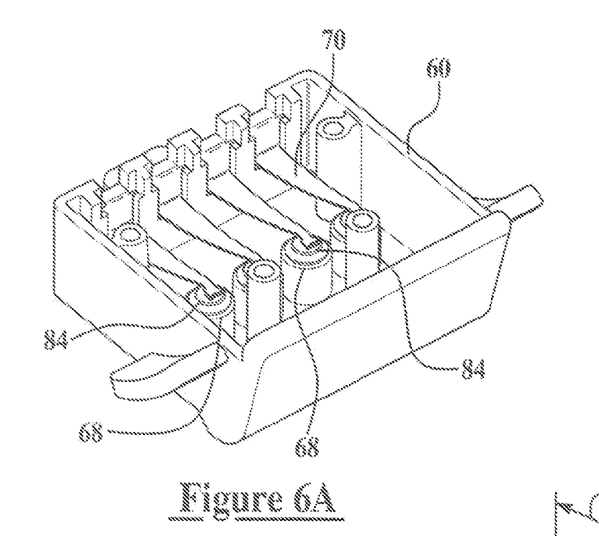
FIGS. 6A and 6B are views of a second electrical connector constructed in accordance with an alternative exemplary embodiment of the present invention.

Referring now to FIGS. 6A-6D, an alternate exemplary embodiment of the present invention is illustrated. Here housing portion 60 is configured to have alternative exterior and interior configuration. As illustrated in FIG. 6A contact members 70 are configured to have cantilevered spring portions each having U-shaped contact ends 84. The contact ends are disposed at one end of contact member 70, which in one non-limiting embodiment comprises a reduced thickness portion of contact 70. The U-shaped contact end will provide enhanced electrical contact with head portion 68. As illustrated, the contact end portion is configured to make contact with head portion 68 of contacts 46.

Figure 6B:
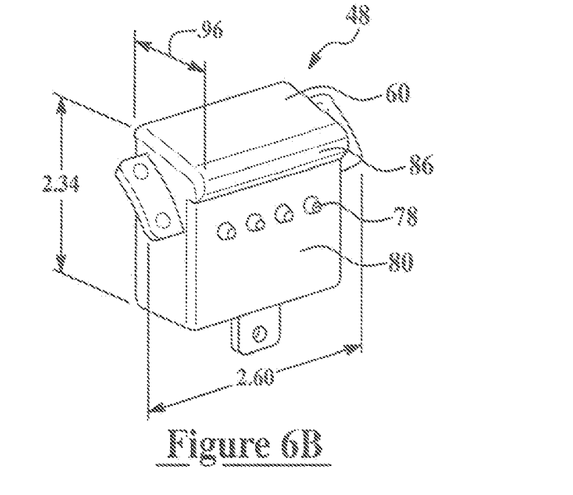
Figure 6C:
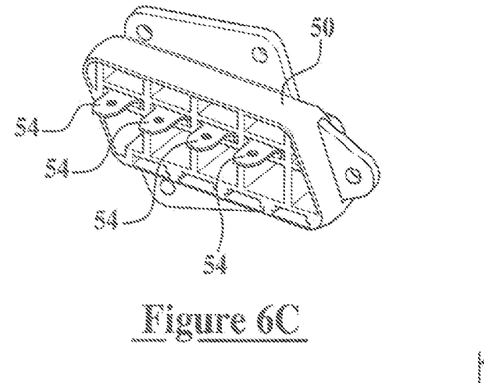
FIGS. 6C and 6D are views of a first electrical connector constructed in accordance with an alternative exemplary embodiment of the present invention.

As illustrated in FIG. 6B, housing 60 is configured to have a raised shoulder surface 86 configured to define a lip or feature for engagement with first connector 42. Moreover, housing 60 is also configured to have a plurality of securement features for securing the same to either a base portion or carrier portion of the child seat. Non-limiting exemplary dimensions of second connector 48 comprise a height of 2.34 inches, a width of 2.60 inches and a depth of 0.96 inches to shoulder surface 86. Of course, dimensions greater or less than the aforementioned values are considered to be within the scope of exemplary embodiments of the present invention.

Figure 6D:
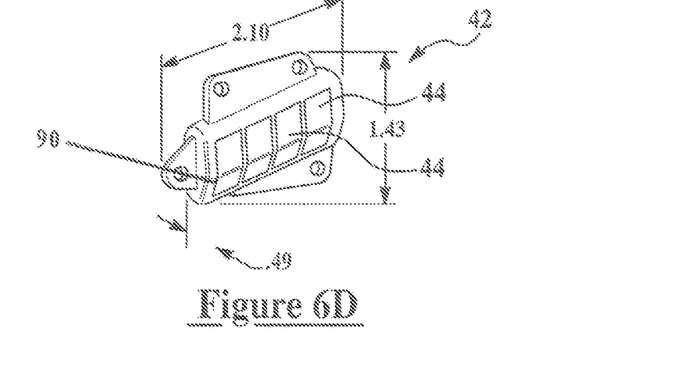

In addition, and referring now to FIG. 6D first connector 42 comprises an angular orientation for termination pads 44 as well as providing a ridge, lip or feature 90 configured for engaging second connector 48. Non-limiting exemplary dimensions of first connector 42 comprise a height of 1.43 inches, a width of 2.10 inches and a depth of 0.49 inches to ridge 90. Of course, dimensions greater or less than the aforementioned values are considered to be within the scope of exemplary embodiments of the present invention.

Figure 7A:
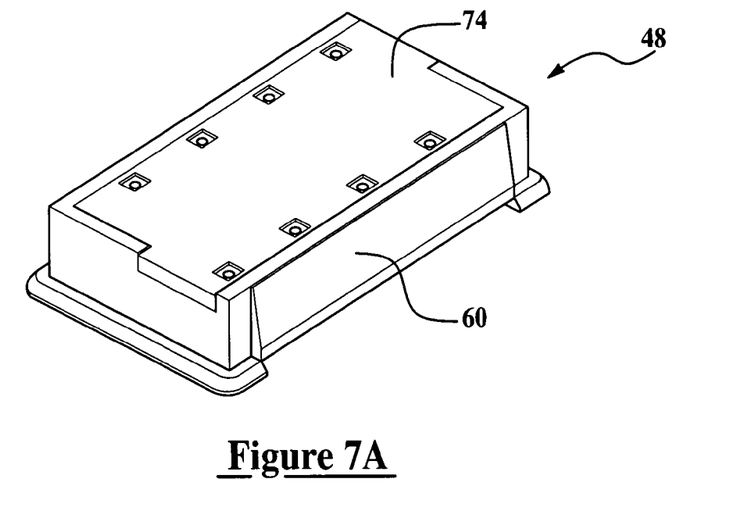
FIGS. 7A and 7B are perspective views of an electrical connector constructed in accordance with an alternative exemplary embodiment of the present invention.
Figure 7B:
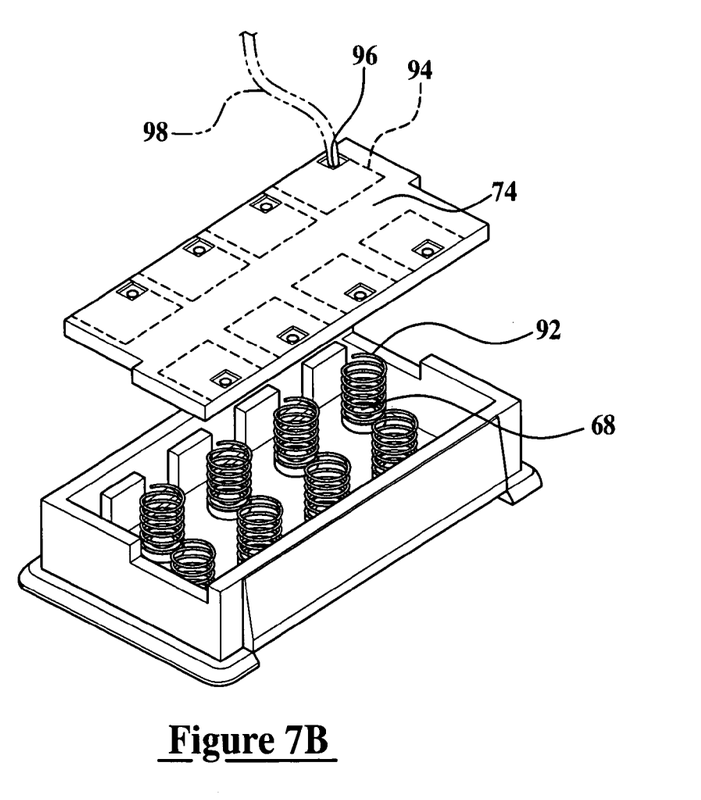

Referring now to FIGS. 7A and 7B, yet another alternative configuration of second connector 48 is illustrated. In this embodiment a plurality of biasing springs 92 are provided to provide a biasing force to contacts 46 as well as make an electrical connection with head portions 68 at one end and a termination pad 94 at the other end, which is an electrical communication with the contact point 96 wherein termination of a wire 98 may be facilitated through soldering, mechanical fasting or any other suitable method. It is also contemplated that springs 92 may be combined with the embodiments of FIGS. 5A-6D in order to increase the biasing force provided to the contacts.

Non-limiting exemplary examples of contact normal forces are: 70-160 gmf. Of course, values greater or less then the aforementioned ranges are contemplated to be within the scope of the present invention. Non-limiting exemplary examples of the contact material of the second connector are—C26000 brass pins with a contact plating of Gold over Palladium Nickel or Gold over Nickel on mating interfaces, C52100 phosphor bronze springs while non-limiting exemplary examples of the contact material of the first connector are—C26000 brass and the insulator material comprises glass filled thermoplastic.

Non-limiting exemplary examples of allowable misalignment of exemplary embodiments are X-dir±0.15, Y-dir±0.15 and Z-dir±0.05

Exemplary embodiments of the present invention provide a rugged design that can withstand abuse, spills, and cleaning. Moreover, the second connector will not trap debris and therefore no protective covers are required. The receptacle pins of the second connector cannot be bent or pulled out. The first connector has a very low profile and is self cleaning (e.g., will not trap loose debris). The large allowable misalignment eliminates the need for floating carriers and flexing of wires/cables. In addition, both connectors can be installed (snapped in) from the outside of the seat/base. This provides the best "punch in" resistance and the connectors can be designed to withstand the forces associated with securing the car seat base into a vehicle.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A child seat adapted for use in a vehicle, the child seat comprising:
   a base portion;
   a carrier portion configured to be removably secured to the base portion;
   a restraint system component;
   a sensor for providing a signal indicative of a state of the restraint system component;
   an electronic control unit secured to either the carrier portion or the base portion, the electronic control unit being operably coupled to the restraint system component to receive the signal, the electronic control unit being capable of processing the signal to provide an output indicative of the state of the restraint system component, wherein the output is visually displayed on a surface of the electronic control unit; and
   an electrical connector for providing electrical connection between the sensor and the electronic control unit, the electrical connector comprising:
      a first contact member secured to either the base portion or the carrier portion, the first contact member having a plurality of contact surfaces; and
      a second contact member secured to either the base portion or the carrier portion, the second contact member having a plurality of spring biased contacts movably secured to the second contact member, wherein the plurality of contact surfaces of the first contact member are configured to make contact with the plurality of spring biased contacts when the carrier portion is secured to the base portion.

2. The child seat as in claim 1, wherein the plurality of spring biased contacts each comprise an elongated portion for slidably passing through an opening in a housing of the second contact member.

3. The child seat as in claim 2, wherein the plurality of spring biased contacts each comprise a head portion configured to prevent the elongated portion from completely passing through the opening in the housing.

4. The child seat as in claim 3, wherein the second contact member further comprises a plurality of springs disposed in the housing, wherein each of the plurality of springs are configured to make electrical contact with a respective one of the plurality of contacts, wherein each of the plurality of springs also provides a biasing forced to a respective one of the plurality contacts.

5. The child seat as in claim 4, wherein the plurality of springs are configured to have a portion received within a slotted opening of the housing.

6. The child seat as in claim 5, wherein the plurality of springs are configured to provide a cantilever spring for providing a biasing forced to the plurality of spring biased contacts.

7. The child seat as in claim 5, wherein the plurality of springs are each configured to have a U shaped portion positioned on a distal end, wherein the U-shaped portion is position to make contact with the head portion of the plurality of contacts.

8. The child seat as in claim 7, wherein the plurality of springs are each configured to have a taper from a point of securement to the housing towards the distal end, wherein the taper provides the biasing force to the plurality of contacts.

9. The child seat as in claim 4, wherein the plurality of springs are each configured to have a U shaped portion positioned on a distal end, wherein the U-shaped portion is position to make contact with the head portion of the plurality of contacts.

10. The child seat as in claim 4, wherein the plurality of contact surfaces of the first contact member are configured to provide a substantially larger contact surface area than a respective one of the plurality of spring biased contacts of the second contact member.

11. The child seat as in claim 3, wherein the second contact member further comprises a plurality of springs disposed within the housing, wherein each of the plurality of springs are configured to make electrical contact with a respective one of the plurality of spring biased contacts.

12. The child seat as in claim 1, wherein the second contact member further comprises a housing having a shoulder portion configured to engage an angular surface of the first contact member when the carrier portion is being secured to the base portion.

13. The child seat as in claim 1, wherein the electrical connector is configured to provide tolerances in three separate directions.

14. The child seat as in claim 13, wherein one of the three separate directions is substantially the same direction as that of the plurality of spring biased contacts movably secured to the second contact member.

15. An electrical connector configured to provide an electrical connection between a carrier portion and a base portion of a child seat having at least one sensor disposed in the carrier portion and an electronic control unit located within the base portion, wherein the electronic control unit provides a visual display on a surface of the electronic control unit, the electrical connector comprising:

a first contact member secured to either the base portion or the carrier portion, the first contact member having a plurality of contact surfaces; and a second contact member secured to either the base portion or the carrier portion, the second contact member having a plurality of spring biased contacts movably secured to the second contact member, wherein the plurality of contact surfaces of the first contact member are configured to make contact with the plurality of spring biased contacts when the carrier portion is secured to the base portion.

16. The electrical connector as in claim 15, wherein the plurality of spring biased contacts each comprise an elongated portion for slidably passing through an opening in a housing of the second contact member, wherein the plurality of spring biased contacts each comprise a head portion configured to prevent the elongated portion from completely passing through the opening in the housing.

17. The electrical connector as in claim 15, wherein the second contact member further comprises a plurality of springs disposed in a housing of the second contact member, wherein each of the plurality of springs are configured to make electrical contact with a respective one of the plurality of contacts, wherein each of the plurality of springs also provides a biasing force to a respective one of the plurality of spring biased contacts and the electrical connector is configured to provide tolerances in three separate directions.

18. The electrical connector as in claim 17, wherein the plurality of springs are configured to have a portion received within a slotted opening of the housing and the plurality of springs are configured to provide a cantilever spring for providing a biasing force to the plurality of spring biased contacts.

19. The electrical connector as in claim 18, wherein the plurality of springs are each configured to have a U shaped portion positioned on a distal end, wherein the U-shaped portion is position to make contact with the head portion of the plurality of contacts and the plurality of springs are each configured to have a taper from a point of securement to the housing towards the distal end, wherein the taper provides the biasing force to the plurality of contacts and the plurality of springs are each configured to have a U shaped portion positioned on a distal end, wherein the U-shaped portion is position to make contact with the head portion of the plurality of contacts.

20. A method for providing an electrical connection between a carrier portion and a base portion of a child seat having an electronic control unit configured to receive a plurality of signals from a plurality of sensors located in the carrier portion and the base portion, the method comprising:

securing a first contact member to either the base portion or the carrier portion, the first contact member having a plurality of contact surfaces; securing a second contact member to either the base portion or the carrier portion, the second contact member having a plurality of spring biased contacts movably secured to the second contact member, wherein the plurality of contact surfaces of the first contact member are configured to make contact with the plurality of spring biased contacts when the carrier portion is secured to the base portion, wherein the second contact member further comprises a plurality of springs disposed in a housing of the second contact member wherein each of the plurality of springs are configured to make electrical contact with a respective one of the plurality of spring biased contacts, wherein each of the plurality of springs also provides a biasing force to a respective one of the plurality of spring biased contacts and the electrical connector is configured to provide tolerances in three separate directions.

21. The child seat as in claim 6, wherein the plurality of springs are arranged in an alternating fashion within a receiving area of the housing.

22. The electrical connector as in claim 18, wherein the plurality of springs are arranged in an alternating fashion within a receiving area of the housing.

* * * * *